United States Patent

[11] 3,530,947

| [72] | Inventor | George J. Gendron |
| | | Oradell, New Jersey |
| [21] | Appl. No. | 779,504 |
| [22] | Filed | Nov. 27, 1968 |
| [45] | Patented | Sept. 29, 1970 |
| [73] | Assignee | Raymond International, Inc. |
| | | New York, New York |
| | | a corporation of New Jersey |

[54] CLAMPING ARRANGEMENT FOR DOUBLE WALLED SHELLS TO BE DRIVEN INTO THE EARTH
14 Claims, 17 Drawing Figs.

| [52] | U.S. Cl. | 175/55, 61/53.5 |
| [51] | Int. Cl. | E21c 3/02 |
| [50] | Field of Search | 175/55; 173/49; 61/53.5 |

[56] References Cited
UNITED STATES PATENTS

| 2,743,585 | 5/1956 | Berthet | 74/61 |
| 2,942,427 | 6/1960 | Berthet | 173/49 |
| 3,100,382 | 8/1963 | Muller | 175/55X |
| 3,131,543 | 5/1964 | Dougherty | 61/53.5 |
| 3,280,924 | 10/1966 | Pavlovich | 173/49X |
| 3,391,435 | 7/1968 | Lebelle | 61/53.5X |
| 3,433,311 | 3/1969 | Lebelle | 175/55X |
| 3,453,831 | 7/1969 | Rusche | 61/53.5 |

*Primary Examiner*—Nile C. Byers, Jr.
*Attorney*—Ward, McElhannon, Brooks and Fitzpatrick ABSTRACT: A clamping arrangement for selectively clamping to a vibrator one of two or both elongated telescopically disposed tubular shells to be driven into the earth.

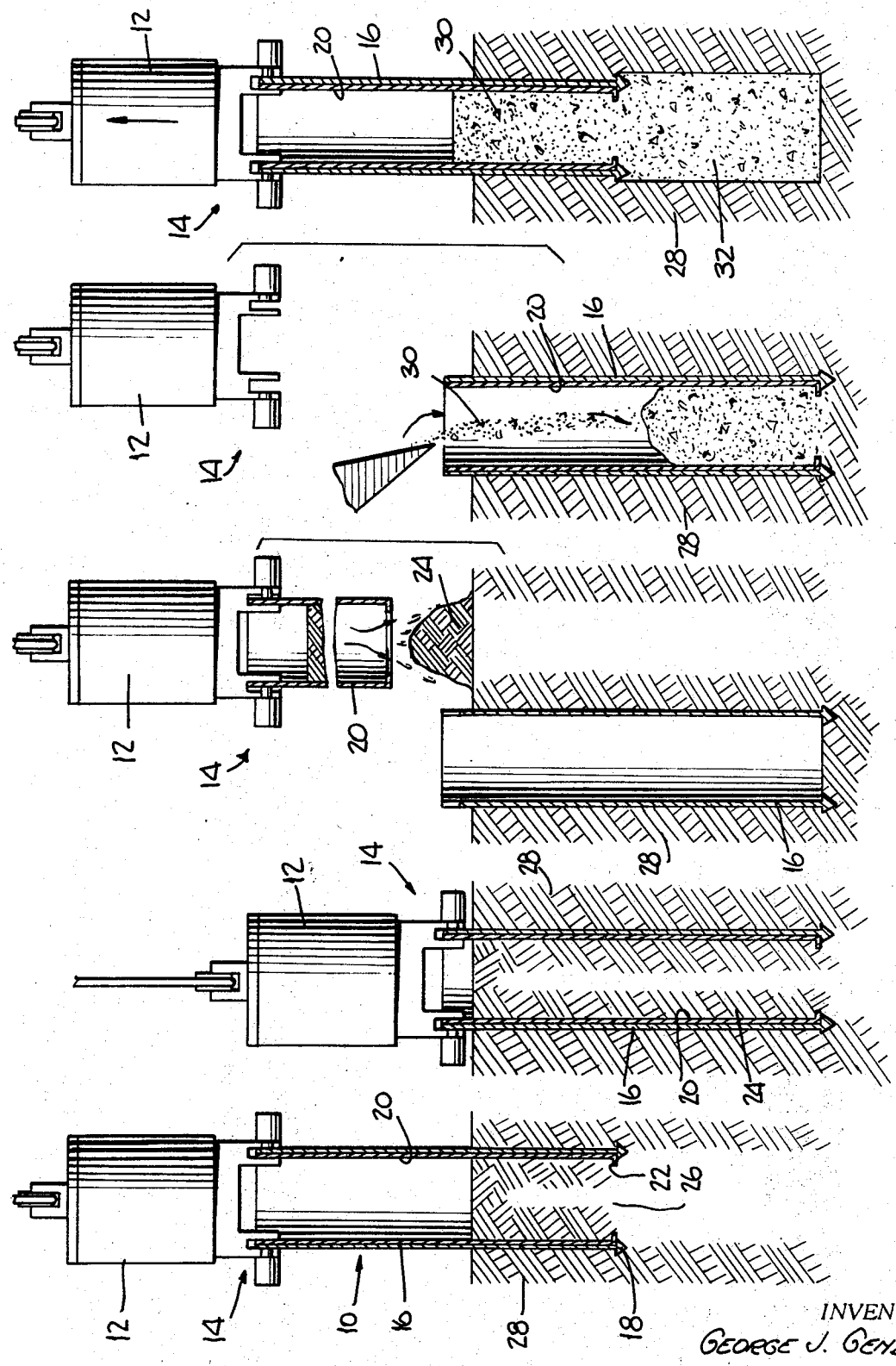

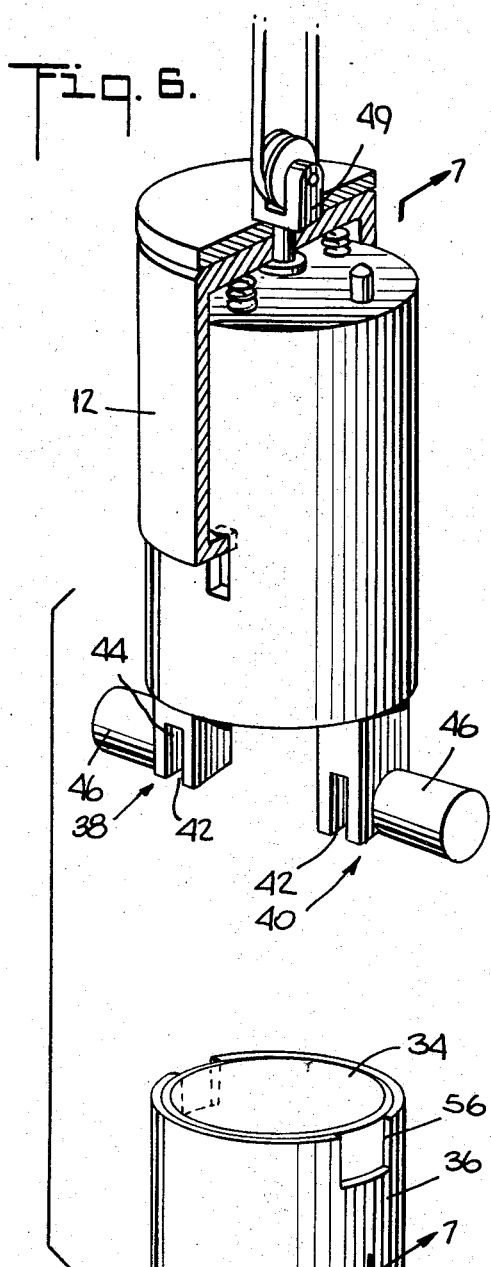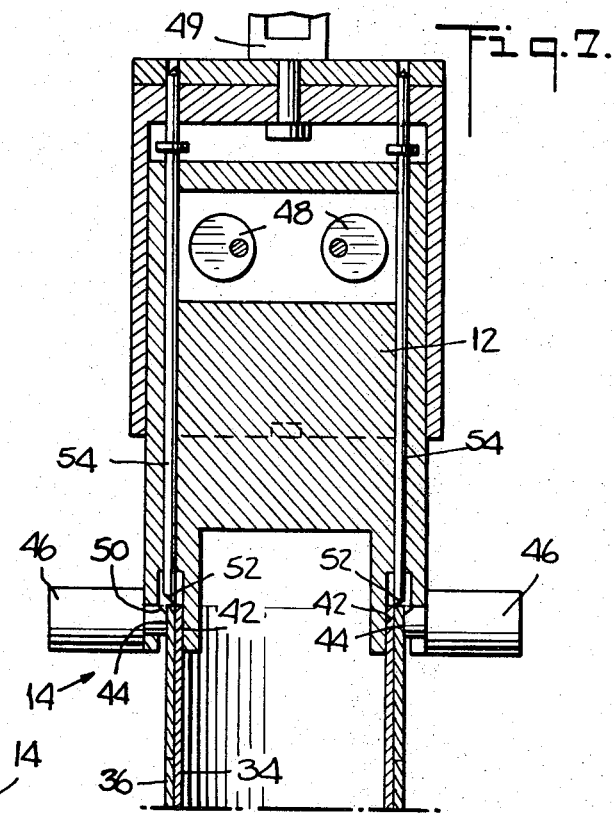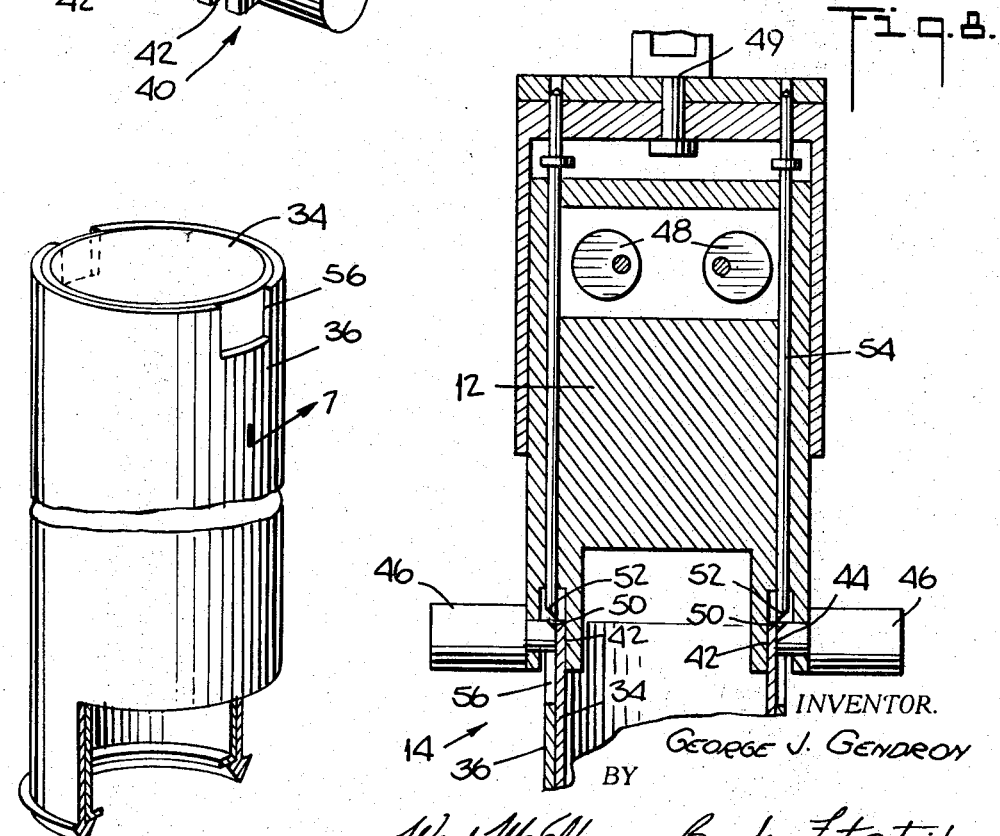

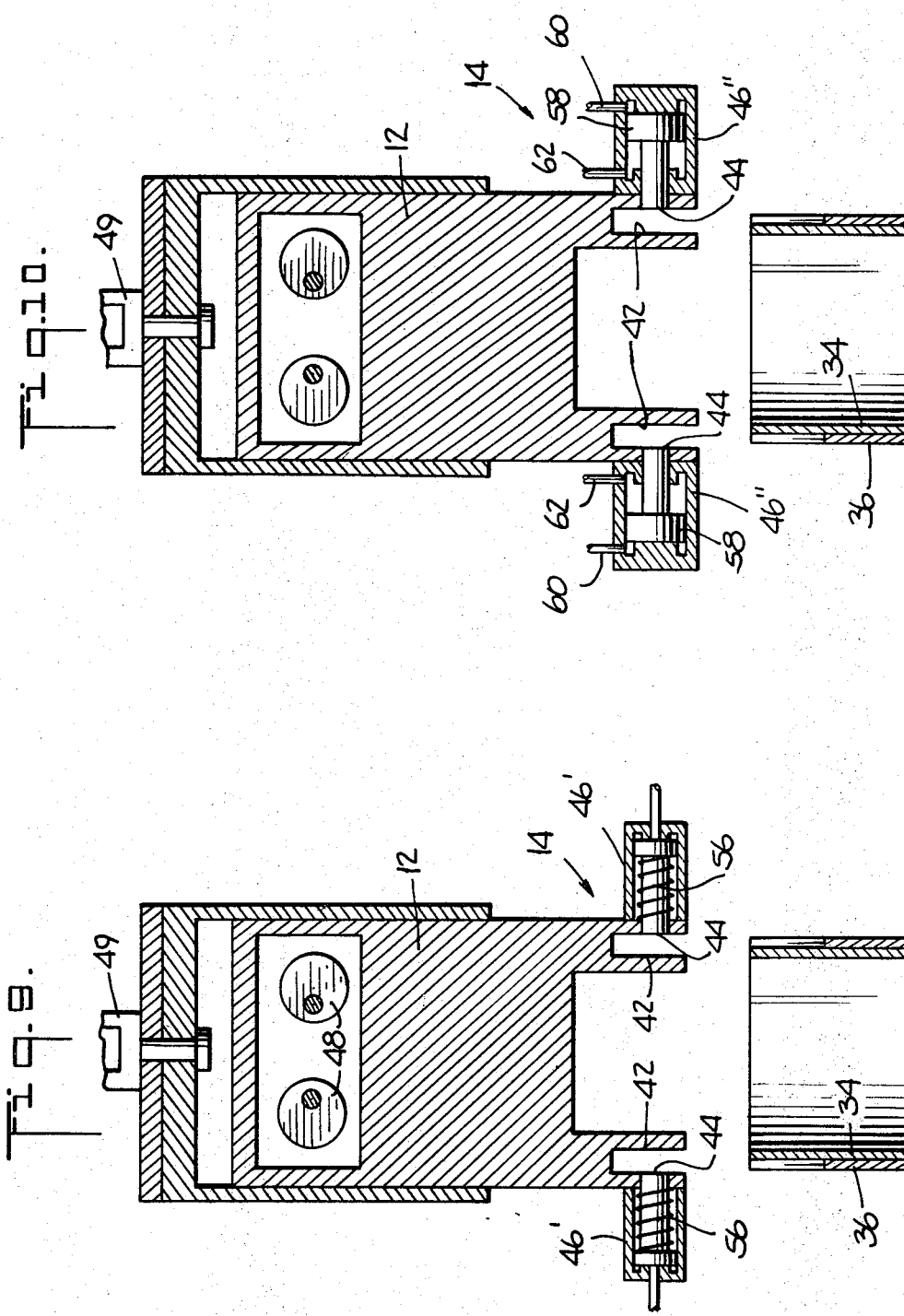

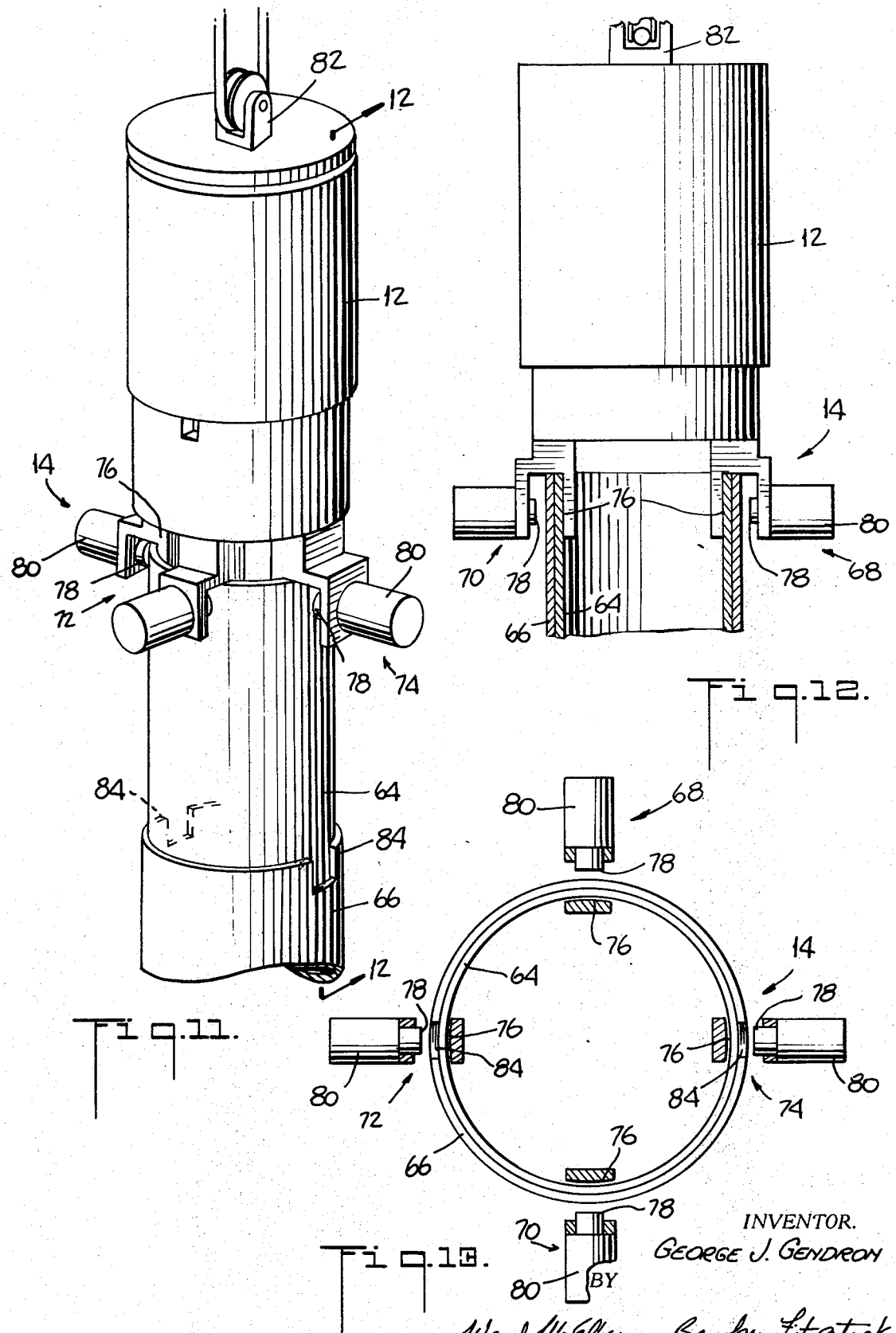

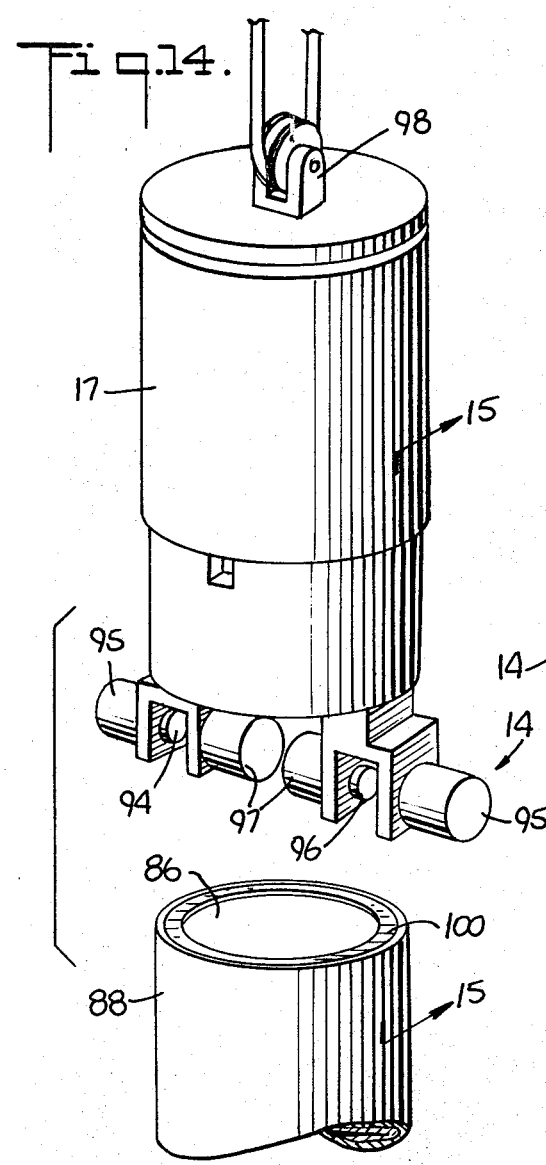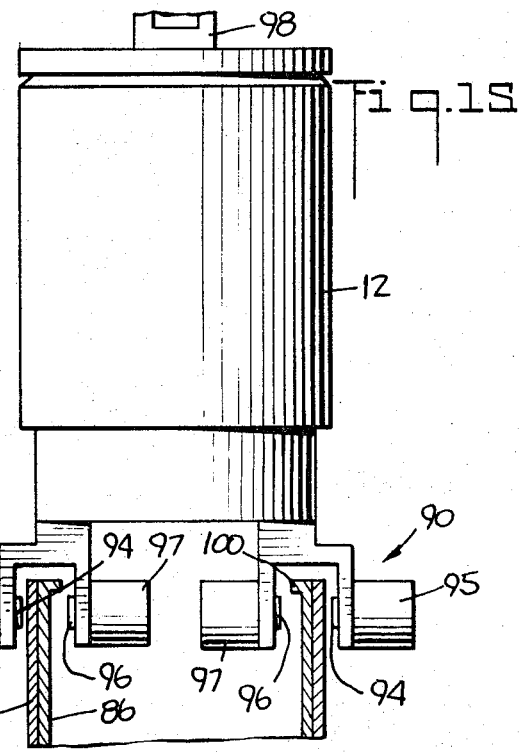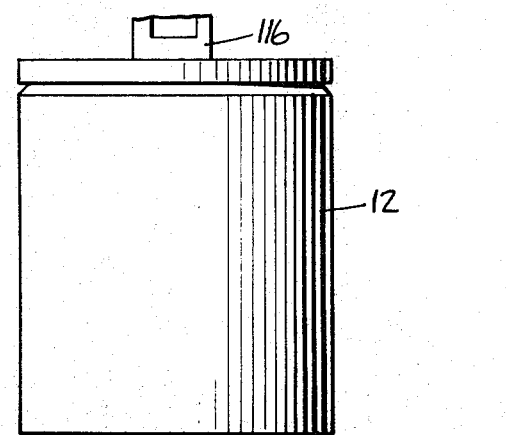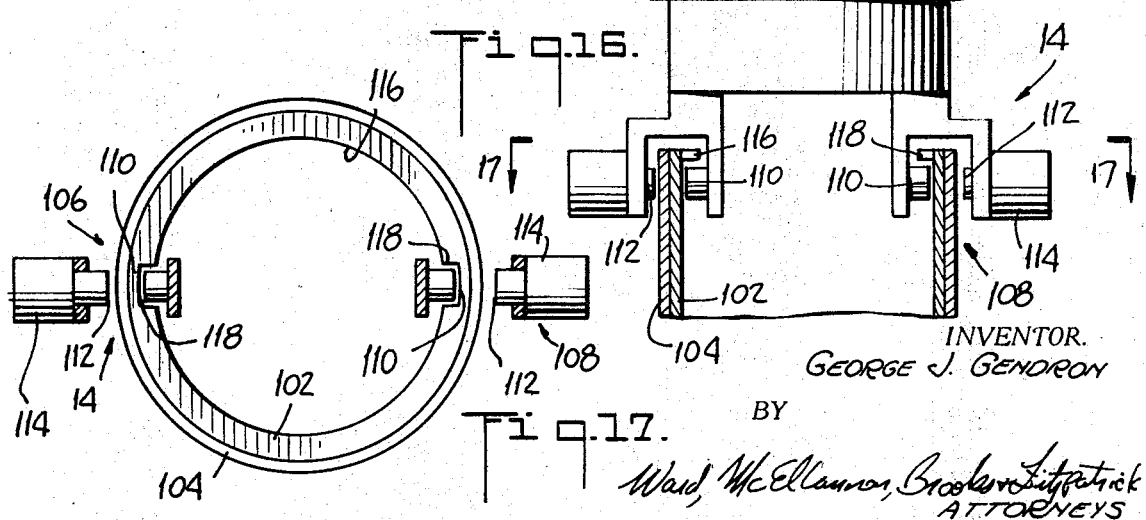

CLAMPING ARRANGEMENT FOR DOUBLE WALLED SHELLS TO BE DRIVEN INTO THE EARTH

This invention has to do with clamping vibrators to double walled elongated telescopically disposed tubular shells to be driven into the earth, such as pile shells, sand drains, well shells and the like. This invention is particularly directed, among other possible uses, to the application of vibrators to the installation of uncased piles. Generally, in this type of installation an open ended double tubing shell is driven into the ground by vibrating means or by using a pile hammer. The soil is allowed to come up inside the inner casing or shell. The vibratory driving method destroys the friction on the inside of the assembly between the soil and the inner shell, and thereby allows a full length inner plug of soil to form. After the assembly is driven, the vibrator is detached from the outer shell. The inner shell, coupled with the plug, is removed, leaving the outer shell in the earth. The inner shell is swung off to the side of the pile location and is vibrated to loosen and remove the inner plug. The inner shell is then reinserted in the outer shell and charged with concrete. When the inner shell has been filled with concrete, the vibrator is again clamped to both shells and they are vibrated as they are withdrawn. The vibrator during withdrawal causes the concrete to flow out through the bottom of the shell, thereby completely filling the void created. The need for being able to clamp either the inner shell alone, or the inner and outer shells together, requires special clamping means. It is an important object of this invention to provide a new and improved arrangement for clamping either the inner shell alone or both shells together, as desired.

The present invention involves a novel combination of features combined in such a way to afford a very economical solution of the difficulties in the problem above discussed. Briefly, it is the concept of this invention to provide a clamping arrangement for selectively clamping one of two or both elongated telescopically disposed tubular shells to be driven into the earth wherein one of the shells has an opening therein. Clamping means are mounted and arranged to selectively clamp the two shells together adjacent their upper edges when in a first position and to extend through the opening in said one shell to grasp only the second shell when in a second position thereof.

In one form of my invention the clamping means comprises a plurality of clamps disposed around the periphery of the shells and the opening comprises a plurality of downwardly extending slots disposed around the periphery of the shells. In another form of the invention, the arrangement further comprises a vibrator for vibrating the shells, preferably attached to the clamping means.

In still another form of the invention, one of the shells has a protruding lip adjacent the upper edge thereof. In this form of the invention each of the clamps has a pair of individually actuatable mating jaws. The clamps are mounted and arranged to clamp both shells together when all four jaws are actuated, and to grasp only the shell with the protruding lip when only the jaws disposed adjacent thereto are actuated.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the design of other structures for carrying out the several purposes of the invention. It is important, therefore, that this disclosure be regarded as including such equivalent constructions as do not depart from the spirit and scope of the invention.

Several embodiments of the invention have been chosen for purposes of illustration and description, and are shown in the accompanying drawings, forming a part of the specification, wherein:

FIGS. 1—5 are a series of vertical sectional views showing the general application of the clamping arrangement of this invention to the installation of a pile;

FIG. 6 is an enlarged exploded perspective view showing a clamping arrangement between a vibrator and a double shell;

FIG. 7 is a vertical sectional view taken along the line indicated at 7—7 in FIG. 6, and showing the vibrator and shell in assembled condition but with the clamping means in its disengaged position;

FIG. 8 is a vertical sectional view similar to FIG. 7, but showing the clamping means in its engaged position;

FIG. 9 is a vertical sectional view similar to FIGS. 7 and 8, but showing a modified form of clamping means;

FIG. 10 is a vertical sectional view similar to FIGS. 7—9, but showing still another form of clamping means;

FIG. 11 is an enlarged perspective view showing another clamping arrangement, according to this invention, between a vibrator and a double walled shell;

FIG. 12 is a vertical sectional view taken along the line indicated at 12—12 in FIG. 11;

FIG. 13 is a plan view of the clamping arrangement of FIGS. 11 and 12;

FIG. 14 is an enlarged exploded perspective view showing still another clamping arrangement, according to this invention, between a vibrator and a double walled shell;

FIG. 15 is a vertical sectional view taken along the line indicated at 15—15 in FIG. 14;

FIG. 16 is a vertical sectional view of another arrangement constructed according to the concept of this invention; and FIG. 17 is a transverse sectional view taken along the line indicated at 17—17 in FIG. 16.

Referring to the drawings in greater detail, as shown in FIGS. 1—5, two concentric cylindrical pile shells or casings, indicated generally at 10, are clamped together and to a vibrator 12 by a clamping arrangement indicated generally at 14. The outer shell 16 is provided with a rim-like outwardly extending lip 18 at the bottom edge for reducing side friction buildup during driving. Inner shell 20 is provided with a rim-like inwardly projecting lip 22 which tends to operate like a "core catcher" and helps to retain an earthen plus 24, FIG. 2, while the inner shell 20 is being removed. As best seen in FIG. 1, the pile shells 10 having an open end 26, are driven by the vibrator 12 down into the ground 28 while the soil is allowed to come up inside the inner shell 20. The vibratory driving method destroys the friction on the inside of the inner shell, and thereby allows a full length inner plug 24, FIG. 2, of soil to form. After the assembly is driven down to a suitable depth, the vibrator 12 is detached from the outer shell 16 only, and the inner shell coupled with the plug is removed. It will be appreciated that when the two shells are clamped together they become slightly distorted but because of their close tolerances this distortion can be kept below their elastic limit so that when they are released they can slide relative to each other. As best seen in FIG. 3, the inner shell 20 is swung off to the side of the pile location and vibrated to remove the inner plug. The inner shell is then reinserted in the outer shell and charged with concrete 30, as seen in FIG. 4. After the inner shell has been filled with concrete, the vibrator 12 is clamped to both shells and they are vibrated during withdrawal, as seen in FIG. 5. The vibration during withdrawal causes the concrete to flow out of the shell and completely fill the void created, as at 32, FIG. 5. The vibration also reduces friction between earth and outer shell 16 to facilitate removal.

In the embodiment of the invention illustrated in FIGS. 6—8, the clamping arrangement 14 is arranged for selectively clamping the inner shell 34 alone or in combination with the outer shell 36. This arrangement includes a pair of substantially oppositely disposed clamps indicated generally at 38 and 40. If desired, a plurality of clamps may be positioned around the periphery of the shells, when the shells are of large diameter, for example. Each of these clamps includes a fixed clamping face 42 and a movable clamping face 44 actuatable by a hydraulic piston assembly 46, provided for the purpose. The clamps are all carried by the vibrator 12. The vibrator employs eccentric wieghts 42, FIG. 7, and is mounted on a swivel, as at 49, for rotational purposes. A top edge 50 of the movable clamp face 44 is bevelled to receive cam tips 52 on push rods 54, which serve as clamp retracting means. The outer shell 36 has a pair of substantially oppositely disposed downwardly extending slots 56 adjacent the upper edge thereof. The clamps 38 and 40 are mounted and arranged so that when they are in their disengaged positions, the shells 34 and 36 are completely separate from the vibrator 12 as seen in FIG. 6; and when said clamps are in a first rotational position they clamp the two shells together and to the vibrator as seen in FIG. 7; and when said clamps are in a second rotational position they extend through the slots 56 in the outer shell to grasp only the inner shell 34 as seen in FIG. 8.

Referring to FIG. 9, the piston assembly 46' is provided with a spring member 56 for returning the movable face 44 to its retracted disengaged position. This spring member serves substantially the same function as the push rod 54 described hereinbefore in connection with FIGS. 7 and 8.

As seen in FIG. 10, the piston assembly 46'' is provided with a double-acting piston 58 so that the movable face 44 may be moved to the left as viewed in FIG. 10 by applying fluid pressure to the connection 60 and releasing the pressure at connection 62, and may be moved to the right as viewed in FIG. 10 by applying fluid pressure to the connection 62 and releasing the pressure at connection 60. The double-acting piston arrangement serves substantially the same function as the piston rod 54 described hereinbefore in connection with FIGS. 7 and 8.

In the embodiment of the invention illustrated in FIGS. 11—13, the clamping arrangement 14 is arranged for selectively clamping the inner shell 64 alone, or in combination with the outer shell 66. This arrangement includes a first pair of oppositely disposed clamps, indicated generally at 68 and 70, and a second pair of spaced oppositely disposed clamps indicated generally at 72 and 74. Each of these clamps comprises a fixed clamping face 76 and a movable clamping face 78 actuatable by a hydraulic piston assembly 80, provided for the purpose. The clamps are all carried by the vibrator 12 which is mounted on a swivel 82. The outer shell 66 has a pair of oppositely disposed downwardly extending slots 84 adjacent the upper edge thereof. These slots are positioned adjacent clamps 72 and 74 so that when these clamps are actuated clamp faces 78 pass through the slots in the outer shell 66 and engage the inner shell 64, thereby to grasp the inner shell alone for lifting purposes, as set forth hereinbefore in connection with the description of FIGS. 1—5. When it is desired to clamp both shells together and to the vibrator, then clamps 68 and 70 are actuated thereby grasping both shells between the two faces of the clamps. The clamps 68, 70, 72 and 74 may be released by any one of the releasing mechanisms described hereinbefore in connection with the embodiments of FIGS. 6—10.

Referring next to the embodiment of the invention illustrated in FIGS. 14 and 15, the clamping arrangement 14 is arranged for selectively clamping the inner shell 86 alone or in combination with the outer shell 88. This arrangement includes a pair of substantially oppositely disposed clamps indicated generally at 90 and 92. Each of these clamps has a first movable clamping face 94 actuatable by hydraulic piston assembly 95, and a second movable clamping face 96 actuatable by a hydraulic piston assembly 97. The clamps are carried by the vibrator 12, which is mounted on a swivel 98. The inner shell 86 has an inwardly protruding annular lip 100 adjacent the upper edge thereof. When it is desired to clamp the two shells together all four clamping faces are actuated, and when it is desired to grasp only the inner shell 86 then only the clamping faces 96 of the clamps 90 and 92 are actuated. These clamping faces engage the underside of the lip 100 to effect upper movement of the inner shell alone. The clamps 90 and 92 may be released by any one of the releasing mechanisms discussed hereinbefore in connection with the embodiments of FIGS. 6—10.

In the embodiment of the invention illustrated in FIGS. 16 and 17, the clamping arrangement 14 is arranged for selectively clamping the inner shell 102 alone or together with the outer shell 104. This arrangement includes a pair of substantially oppositely disposed clamps indicated generally at 106 and 108. Each of these clamps has a fixed clamping face 110 and a movable clamping face 112 actuated by a hydraulic piston 114 provided for the purpose. The clamps are carried by the vibrator 12 which is mounted on a swivel 116. The inner shell 102 has an inwardly protruding annular lip 116 with a pair of substantially oppositely disposed slots 118. When the clamps are in a first rotational position wherein fixed clamping faces 112 are in longitudinal alignment with the slots 118 and the movable clamping faces 112 are in their retracted position, the vibrator 12 may be withdrawn from the entire assembly. When the clamps are in a second rotational position wherein the fixed clamping faces 110 are not in alignment with the slots 118 and the movable clamping faces 112 are in their retracted positions, the inner shell 102 may be withdrawn due to the engagement of the fixed clamping faces 110 with the lip 116. When the clamps are in said second rotational position and the faces 110 are not in alignment with the slots 118, and the movable clamping faces 112 are actuated and hence in engagement with the outer shell 104, the two shells are clamped together and to the vibrator 12. The clamps 106 and 108 may be released by any one of the releasing mechanisms described hereinbefore in connection with the embodiments of FIGS. 6—10.

It will thus be seen that the present invention does indeed provide improved clamping arrangements which are superior in simplicity, economy and efficiency as compared to prior art in such arrangements.

Although certain particular embodiments of the invention are herein disclosed for purposes of explanation, various modifications thereof, after study of this specification, will be apparent to those skilled in the art to which the invention pertains.

I claim:

1. A clamping arrangement for selectively clamping one of two or both elongated telescopically disposed tubular shells to be driven into the earth wherein one of said shells has downwardly extending slot means adjacent the upper edge thereof, said arrangement comprising clamping means mounted and arranged when in a first position to clamp said two shells together and when in a second position to extend through the slot in said one shell to grasp only the other shell.

2. A clamping arrangement according to claim 1 wherein said clamping means comprises a plurality of clamps and wherein said slot means comprises a plurality of slots.

3. A clamping arrangement according to claim 1 further comprising a vibrator for vibrating said shells.

4. A clamping arrangement according to claim 3 wherein said vibrator is attached to said clamping means.

5. A clamping arrangement for selectively clamping one of two or both elongated telescopically disposed tubular shells to be driven into the earth comprising a pair of substantially oppositely disposed clamps, the outer of said shells having a pair of substantially oppositely disposed downwardly extending slots adjacent the upper edge thereof, each of said clamps being mounted and arranged when in a first rotational position to clamp said two shells together and when in a second rotational position to extend through said slot in the outer shell to grasp only the inner shell.

6. A clamping arrangement according to claim 5 wherein each of said clamps has a fixed clamping face positionable adjacent said inner shell and a movable clamping face positionable adjacent said shell casing.

7. A clamping arrangement for selectively clamping one of two or both elongated telescopically disposed tubular shells to be driven into the earth wherein one of said shells has a downwardly extending slot adjacent the upper edge thereof, a first independently actuatable clamp mounted and arranged to clamp said two shells together adjacent the upper edges thereof, a second independently actuatable clamp mounted and arranged to extend through said slot in said one shell to grasp only the other shell.

8. A clamping arrangement for selectively clamping one of two or both elongated telescopically disposed tubular shells to be driven into the earth wherein the outer shell has a pair of substantially oppositely disposed downwardly extending slots adjacent the upper edge thereof, a first pair of substantially oppositely disposed actuatable clamps mounted and arranged to clamp said two shells together adjacent the upper edges thereof, a second pair of substantially oppositely disposed independently actuatable clamps mounted and arranged to extend through said slots in the outer shell to grasp only the inner shell.

9. A clamping arrangement according to claim 8 wherein each of said clamps has a fixed clamping face positionable adjacent said inner shell and a movable clamping face positionable adjacent said outer shell.

10. A clamping arrangement for selectively clamping one of two or both elongated telescopically disposed tubular shells to be driven into the earth wherein one of said shells has a protruding lip adjacent the upper edge thereof, a pair of substantially oppositely disposed clamps, each of said clamps having a pair of individually actuatable clamping faces, said clamps being mounted and arranged to clamp said two shells together when all four clamping faces are actuated and to grasp only said first shell with the protruding lip when only the clamping faces adjacent said one shell are actuated.

11. A clamping arrangement for selectively clamping one of two or both elongated telescopically disposed tubular shells to be driven into the earth wherein the inner shell has an inwardly protruding lip adjacent the upper edge thereof, a pair of substantially oppositely disposed clamps, each of said clamps having a pair of individually actuatable mating clamping faces, said clamps being mounted and arranged to clamp said two shells together when all four clamping faces are actuated and to grasp only said inner shell with the protruding lip when only the clamping faces adjacent said inner shell are actuated.

12. A clamping arrangement for selectively clamping one of two or both elongated telescopically disposed tubular shells to be driven into the earth wherein the inner shell has an inwardly protruding annular lip adjacent the upper edge thereof, said lip having a pair of substantially oppositely disposed radially extending slots therein, a pair of substantially oppositely disposed clamps, each of said clamps having a fixed clamping face positionable under said annular lip and a movable clamping face positionable adjacent the outer shell, each of said clamps being mounted and arranged to be withdrawn from both shells when the fixed clamping faces are in longitudinal alignment with said slots and said movable clamping faces are in their retracted positions, and the inner shells only may be withdrawn when said fixed clamping faces are engageable with said lip and said movable clamping faces are in their retracted positions, and both shells may be clamped together when said fixed clamping faces are engageable with said lip and said movable clamping faces are in engagement with the outer shell.

13. A clamping arrangement comprising a pair of elongated telescopically disposed tubular shells to be driven into the earth, one of said shells having exposed inner and outer surfaces in the vicinity of the upper end thereof, clamping means mounted and arranged when in a first position to clamp said two shells together and when in a second position to grasp only the exposed surfaces of said one shell.

14. A clamping arrangement comprising a pair of elongated telescopically disposed tubular shells to be driven into the earth, one of said shells having exposed inner and outer surfaces in the vicinity of the upper end thereof, a first pair of substantially oppositely disposed actuatable clamps mounted and arranged to clamp said two shells together adjacent the upper edges thereof, a second pair of substantially oppositely disposed independently actuatable clamps mounted and arranged to grasp only the exposed surfaces of said one shell.